Jan. 20, 1953     R. SERRELL ET AL     2,626,103
POLYNOMIAL EQUATION SOLVER
Filed July 21, 1949
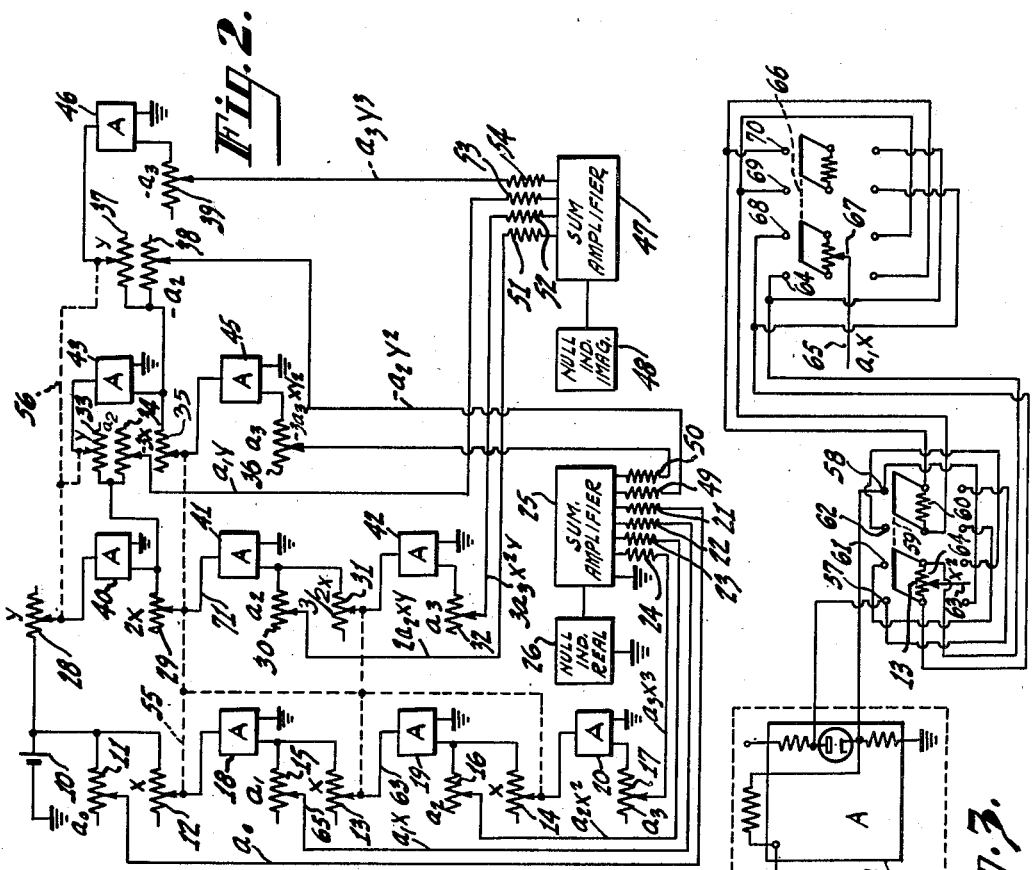
INVENTOR:
ROBERT SERRELL &
EDWIN A. GOLDBERG
BY Morris Rabin
ATTORNEY Patented Jan. 20, 1953

2,626,103

UNITED STATES PATENT OFFICE 2,626,103

POLYNOMIAL EQUATION SOLVER

Robert Serrell, Princeton, and Edwin A. Goldberg, Princeton Junction, N. J., assignors to Radio Corporation of America, a corporation of Delaware Application July 21, 1949, Serial No. 105,936

2 Claims. (Cl. 235—61)

This invention relates to computing devices, and has for its principal purpose the provision of an improved device and method of operation whereby the real and complex roots of polynomials (algebraic equations) may be determined.

This improved device includes linear amplifiers, linear potentiometers and null indicators similar to those described in Brown and Goldberg Patent No. 2,454,549 and Brown Patent No. 2,455,974. These amplifiers and potentiometers are interconnected in such a manner as to build up (by "direct synthesis") the complex values of the polynomial whose roots are desired. By means of two separate mechanical gangings of certain of the potentiometers and two null indicators, the real and imaginary parts of the roots of the polynomial may be determined.

The invention will be better understood from the following description considered in connection with the accompanying drawings and its scope is indicated by the appended claims.

Referring to the drawings:

Fig. 1 is a circuit diagram illustrating a portion of the computer illustrated in Fig. 2 and included for the purpose of explaining how the computer of Fig. 2 is utilizable for solving polynomials having real coefficients and real roots, Fig. 2 illustrates a form of the invention suitable for solving polynomials having real coefficients and complex roots, and Fig. 3 illustrates the detailed connections of the potentiometers which are shown more or less diagrammatically in Figs. 1 and 2.

As hereinafter explained in connection with Fig. 3, the adjustments required to establish voltages representative of the various terms of the equation are effected by means of potentiometers, the values of such voltages being determined by the adjustment of the potentiometers and the polarities of the voltages being determined by the position of the potentiometer switches. All amplifiers herein except summing amplifiers are adjusted to have unity gain.

The general polynomial is:

$$a_0 + a_1 Z + a_2 Z + \ldots + a_n Z^n$$

where $$Z = x + iy; \ (i = \sqrt{-1})$$

Case I.—Real coefficients and real roots. $a_0 \ldots a_n$ all real; $y = 0$; (no complex roots). Then, a root is any value of $x$ such that:

$$a_0 + a_1 x + a_2 x^2 + \ldots + a_n x^n = 0$$

The device of Fig. 1 is shown as arranged to solve the above polynomial for the case where $n=3$. This device includes a unit voltage source 10, a plurality of linear potentiometers 11 to 17, three amplifiers 18 to 20, four summing resistors 21 to 24, a summing amplifier 25 and a null indicator 26.

While the source 10 is shown as a D. C. source, an A. C. source may be used with satisfactory results. In order to simplify the drawing, the linear potentiometers are shown somewhat diagrammatically. Their actual connections are to be explained in connection with Fig. 3. The linear amplifiers 18 to 20, the summing amplifier 25 and the null indicator 26 are like those of the aforesaid patents (except that the amplifiers include a feed-back resistor as shown in Fig. 3) and are not described herein in detail.

In operating the device of Fig. 1, the potentiometer 11 is so adjusted as to apply through the resistor 21 to the input of the amplifier 25 a voltage which is representative of the value of the term $a_0$ of the equation. Then the potentiometers 15, 16 and 17 are adjusted according to the respective values of $a_1$, $a_2$ and $a_3$. Under these conditions, simultaneous adjustment of the potentiometers 12, 13, 14 which are ganged together as indicated by the broken line 27, results in a null indication on the meter 26. Increasing the value of $x$ from its maximum negative value to its maximum positive value will produce as many such null indications as there are distinct real roots. The values of these roots may be read from the indicator associated with the knob by which the values of $x$ are adjusted.

In the case involving real coefficients the complex roots, $$a_0 \ldots a_n \text{ real; } y \neq 0 \text{ (complex roots)}$$

The polynominal is now:

$$a_0 + a_1(x+iy) + a_2(x+iy)^2 + \ldots + a_n(x+iy)^n = 0$$

Expanding term by term we have:

$$a_m(x+iy)^m = a_m \left\{ x^m + \begin{bmatrix} m \\ 1 \end{bmatrix}(iy)(x)^{m-1} + \begin{bmatrix} m \\ 2 \end{bmatrix}(iy)^2(x)^{m-2} + \ldots + \begin{bmatrix} m \\ k \end{bmatrix}(iy)^k(x)^{m-k} + \ldots + \begin{bmatrix} m \\ m \end{bmatrix}(iy)^m \right\}$$

or $$a_m(x+iy)^m = a_m \sum_{k=0}^{k=m} \begin{bmatrix} m \\ k \end{bmatrix} (iy)^k x^{m-k}$$

where $$\begin{bmatrix} m \\ k \end{bmatrix} = \frac{m!}{k!(m-k)!}$$

Noting that $(i)^2 = -1$, $(i)^3 = -i$, $(i)^4 = 1$, etc. the coefficients of the various powers of $x$ and $y$ may be tabulated as follows:

(up to $n=4$)

$$a_0 \quad \begin{bmatrix} 1 \\ 1 \end{bmatrix} ia_1 y \quad -\begin{bmatrix} 2 \\ 2 \end{bmatrix} a_2 y^2 \quad -\begin{bmatrix} 3 \\ 3 \end{bmatrix} ia_3 y^3 \quad \begin{bmatrix} 4 \\ 4 \end{bmatrix} a_4 y^4$$

$$\begin{bmatrix} 1 \\ 0 \end{bmatrix} a_1 x \quad \begin{bmatrix} 2 \\ 1 \end{bmatrix} ia_2 xy \quad -\begin{bmatrix} 3 \\ 2 \end{bmatrix} a_3 xy^2 \quad -\begin{bmatrix} 4 \\ 3 \end{bmatrix} ia_4 xy^3 \quad \text{------}$$

$$\begin{bmatrix} 2 \\ 0 \end{bmatrix} a_2 x^2 \quad \begin{bmatrix} 3 \\ 1 \end{bmatrix} ia_3 x^2 y \quad -\begin{bmatrix} 4 \\ 2 \end{bmatrix} a_4 x^2 y^2 \quad \text{--------}$$

$$\begin{bmatrix} 3 \\ 0 \end{bmatrix} a_3 x^3 \quad \begin{bmatrix} 4 \\ 1 \end{bmatrix} ia_4 x^3 y \quad \text{--------}$$

$$\begin{bmatrix} 4 \\ 0 \end{bmatrix} a_4 x^4 \quad \text{--------}$$

or $$\begin{array}{ccccc}
a_0 & ia_1 y & -a_2 y^2 & -ia_3 y^3 & a_4 y^4 \\
a_1 x & 2ia_2 xy & -3a_3 xy^2 & -4ia_4 xy^3 & \\
a_2 x^2 & 3ia_3 x^2 y & -6a_4 x^2 y^2 & & \\
a_3 x^3 & 4ia_4 x^3 y & & & \\
a_4 x^4 & & & &
\end{array}$$

Algebraic sums of the odd (real) columns and of the even (imaginary) columns are to be formed separately and $x$ and $y$ are to be adjusted until both sums vanish. The total number of terms is obviously:

$$1+2+3+\ldots+(n)+(n+1)$$

or:

$$\sum_{j=1}^{j=(n+1)} j = \frac{(n+1)^2+(n+1)}{2} = \frac{n^2+2n+1+n+1}{2} = \frac{n^2+3n+2}{2}$$

Fig. 2 shows the device as adapted to solve the equation in the case where $n=3$. This form of the device includes, in addition to the components of Fig. 1, linear potentiometers 28 to 39, linear amplifiers 40 to 46, a summing amplifier 47 and null indicator 48 for the imaginary roots, and summing resistors 49 to 54.

All the $x$ potentiometers 12, 13, 14, 29, 31 and 35 are ganged together as indicated by the broken line 55. All the $y$ potentiometers 28, 33 and 37 are ganged together as indicated by the broken line 56. Above each of the linear potentiometers is an underlined legend, such as $a_0$ for example, indicating the term in the expansion of the polynominal to which the output voltage of the potentiometer is adjusted. Applied to the various leads are legends indicating the terms which are represented by the voltages of the respective leads.

For example, a voltage representative of the value of $y$ is applied to the input of the amplifier 40 which has its output potentiometer 29 adjusted according to the value $2x$. As a result, the input voltage to the amplifier 41 is representative of the value of $2xy$. Since the output potentiometer 30 of the amplifier 41 is adjusted according to the value of $a_2$, it follows that a voltage representative of the value of $2a_2 x y$ is applied through the summing resistor 51 to the summing amplifier 47.

By following the same procedure in connection with the other channels which terminate at the summing resistors 21 to 24, 49, 50 and 52 to 54, the effects produced by these various channels is readily understood without more detailed explanation.

In operating the device of Fig. 2 to determine the real and imaginary roots of the polynomial, the procedure is as follows:

For real roots (1) adjust the control knob of the $y$ potentiometers 28, 33 and 37 to zero and (2) operate the control knob of the ganged $x$ potentiometers until the indicator 26 shows a null. As the value of $x$ is increased from its maximum negative value to its maximum positive value, there will be found as many nulls as there are distinct real roots, the values of such roots being indicated by the indicator associated with the $x$ control knob.

For complex roots (1) adjust the $y$ control knob to some arbitrary value of $y$ other than zero, (2) adjust the $x$ control knob to produce a zero reading on the indicator 26, and (3) preserving this zero reading on the indicator 26, adjust the $x$ and $y$ control knobs in turn until a zero reading appears on the indicator 48. At this point, the indicators associated with the $x$ and $y$ control knobs indicate the real and imaginary parts, respectively, of a complex root. By starting, in this manner, from one end of the scale and proceeding uniformly toward the other end, there is obtained the roots (either real or complex) in the order of their magnitude.

Fig. 3 shows in greater detail how the linear potentiometers are made to apply output voltages which are of such polarity and value as to truly represent the various terms of the polynomial. In this figure, the amplifier 18 is taken as an example. Since the operation of all the other amplifiers involves the same principle, such operation is readily understood without detailed consideration.

The amplifier 18 has its anode and cathode connected respectively to the fixed contacts 57 and 58 of a double throw switch 59. When the switch 59 is in its lower closed position, the anode terminal 57 is connected through a resistor 60 to the positive lead 61 and the cathode terminal 58 is connected through the potentiometer 13 to the negative lead 62. Under these conditions, the left hand terminal of the potentiometer 13 is more positive than its right hand terminal. When the switch 59 is in its upper closed position, the anode terminal 57 is connected through the potentiometer 13 to the positive lead 61 and the cathode terminal 58 is connected through the resistor 60 to the negative lead 62. Under these conditions, the left hand end of the potentiometer 13 is more negative than its right hand end. Thus the closed positions of the switch 59 determine the polarity of the output voltage applied from the potentiometer 13 to the lead 63.

As indicated in Fig. 2, there is applied to the input of the amplifier 18 from the potentiometer 12 a voltage which is representative of the value of $x$. Assuming the switch 59 (Fig. 3) to be in its upper closed position, the voltage across the potentiometer 13 is of negative polarity and has a value proportional to the value of $x$. By adjusting the movable contact 64 of the potentiometer 13 according to the value of $x$ there is made available at the input of amplifier 19 a voltage representative of the value of $x^2$.

For producing a voltage representative of $a_1 x$ at the input lead 65 of the summing amplifier 25 there is provided means including a switch 66 which has its upper fixed terminals 67 to 70 connected to the end terminals of the potentiometer 13 and the resistor 60. From the potentiometer 13 there is applied to the potentiometer 15 a voltage which is representative of the value of $x$ and has its polarity determined by the closed position of the switch 66 as explained in connection with the switch 59. Assuming the movable contact 67 of the potentiometer 15 to be adjusted according to the value of $a_1$, there is produced at the input 65 of the summing amplifier 25 a voltage representative of the value of $a_1 x$.

What the invention provides is an equation solver which functions to solve polynomials for their real and complex roots by the direct synthesis method.

What is claimed is:

1. An equation solver for a polynomial equation of the type $$a_0 + a_1(x+iy) + a_2(x+iy)^2 \ldots a_n(x+iy)^n$$

having real and imaginary terms and real and imaginary roots, said equation solver consisting of a plurality of linear amplifiers, a plurality of linear potentiometers, one for each coefficient, one for each $x$, and one for each $y$ in said equation, all said coefficient potentiometer sliders being positioned to represent coefficients in said equation, all said $x$ potentiometer sliders being ganged together to be movable simultaneously, all said $y$ potentiometer sliders being ganged together to be movable simultaneously, means to apply a unit potential to a first $x$ potentiometer, to a first $y$ potentiometer and to a coefficient potentiometer representative of the coefficient $a_0$, a plurality of first means to couple in cascade a number of said $x$ potentiometers and coefficient potentiometers to the slider of said first $x$ potentiometer to simulate the real terms $a_1 x$ to $a_n x^n$ in said equation, a plurality of second means to couple in cascade remaining ones of said $x$ potentiometers, $y$ potentiometers and coefficient potentiometers to the slider of said first $y$ potentiometer to simulate the remaining real and imaginary terms of said equation, first and second summing means, first and second null indicating means respectively connected to the outputs of said first and second summing means, all the sliders of the coefficient potentiometers which are used to simulate said real terms being electrically connected to said first summing means, all the sliders of the coefficient potentiometers which are used to simulate said imaginary terms being electrically connected to said second summing means, and means to adjust said ganged $x$ potentiometer sliders and said ganged $y$ potentiometer sliders whereby these sliders are positioned at values respectively representative of the real and imaginary roots of said equation whenever both said null indicators indicate a null.

2. An equation solver as recited in claim 1 wherein said first and second plurality of means to couple in cascade includes said linear feedback amplifiers, the input to each of certain ones of said amplifiers being connected to the slider of an $x$ potentiometer, the output from each of said certain ones of said amplifiers being connected to a following $x$ potentiometer and a coefficient potentiometer, the input to each of the remaining ones of said amplifiers being connected to the sliders of a $y$ potentiometer, and the output from each of said remaining ones of said amplifiers being connected to a following $x$ potentiometer, $y$ potentiometer and a coefficient potentiometer.

ROBERT SERRELL.
EDWIN A. GOLDBERG.

REFERENCES CITED

The following references are of record in the file of this patent:

UNITED STATES PATENTS

| Number | Name | Date |
| --- | --- | --- |
| 2,468,150 | Wilcox | Apr. 26, 1949 |
| 2,494,036 | Darlington | Jan. 10, 1950 |
| 2,519,223 | Cheek | Aug. 15, 1950 |
| 2,519,262 | Lovell | Aug. 15, 1950 |

OTHER REFERENCES

"An electromechanical method for solving equations," Schooley, RCA Review, volume III, July 1938, No. 1, pages 86–96.

"An electrical algebraic equation solver," Herr and Graham, Rev. Sci. Inst., October 1938, volume 9, pages 310–315.

"Analysis of problems in dynamics by electronic circuits," Ragazzini, IRE Proceeding, volume 35, No. 5, May 1947, pages 444–452.

"Electrical analogue computing," Mynall, Electrical Engineering, July 1947, page 214.

"Electronic Instruments," Greenwood et al., Radiation Laboratory Series, No. 21, McGraw-Hill Publishing Co., April 20, 1948, pages 120–122.